(12) United States Patent
Tu et al.

(10) Patent No.: US 10,921,850 B1
(45) Date of Patent: Feb. 16, 2021

(54) SYSTEMS AND METHODS FOR CLOCK SYNCHRONIZATION IN TRANSMISSION OF AUDIO INFORMATION

(71) Applicant: BESTECHNIC (SHANGHAI) CO., LTD., Shanghai (CN)

(72) Inventors: Zhichen Tu, Shanghai (CN); Wenyu Xiao, Shanghai (CN); Lu Chai, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/855,956

(22) Filed: Apr. 22, 2020

(30) Foreign Application Priority Data

Mar. 14, 2019 (CN) .......................... 2019000192221

(51) Int. Cl.
    *G06F 1/12* (2006.01)
    *G06F 13/42* (2006.01)
    *G06F 1/06* (2006.01)
    *G06F 1/14* (2006.01)

(52) U.S. Cl.
CPC .................. *G06F 1/12* (2013.01); *G06F 1/06* (2013.01); *G06F 13/4282* (2013.01); *G06F 1/14* (2013.01); *G06F 2213/0042* (2013.01)

(58) Field of Classification Search
CPC .......... G06F 1/12; G06F 1/06; G06F 13/4282; G06F 2213/0042
USPC ....................................................... 713/400
See application file for complete search history.

(56) References Cited

U.S. PATENT DOCUMENTS

| | | | | |
|---|---|---|---|---|
| 10,353,424 | B2* | 7/2019 | Woodhead | G06F 1/08 |
| 10,627,851 | B2* | 4/2020 | Chen | G06F 1/08 |
| 2007/0086554 | A1* | 4/2007 | Tominaga | G06F 13/4286 375/372 |
| 2007/0091935 | A1* | 4/2007 | Yonezawa | H04N 21/4305 370/503 |
| 2010/0054387 | A1* | 3/2010 | Wu | H04L 7/08 375/376 |
| 2010/0122106 | A1* | 5/2010 | Lee | H03L 7/113 713/503 |
| 2010/0299462 | A1* | 11/2010 | Yen | H03L 7/085 710/61 |
| 2011/0016346 | A1* | 1/2011 | Lee | H03L 7/087 713/503 |
| 2011/0099411 | A1* | 4/2011 | Lin | G06F 11/0793 713/600 |

(Continued)

*Primary Examiner* — Volvick Derose
(74) *Attorney, Agent, or Firm* — Bayes PLLC

(57) ABSTRACT

Embodiments of systems and methods for clock synchronization for transmission of audio information are disclosed herein. In one example, a System on Chip (SoC) includes a Universal Serial Bus (USB) transceiver, an oscillator circuit free of a crystal, a frequency divider, and a clock synchronization calibrator. The USB transceiver is configured to extract a first synchronization clock associated with data received by the USB transceiver. The oscillator circuit free of a crystal is configured to generate an original clock. The frequency divider is configured to generate a second synchronization clock based on the original clock. The clock synchronization calibrator configured to generate a first set of frequency control data based on a frequency difference between the first synchronization clock and the second synchronization clock.

20 Claims, 4 Drawing Sheets

(56) References Cited

U.S. PATENT DOCUMENTS

| | | | |
|---|---|---|---|
| 2013/0021106 A1* | 1/2013 | Bracmard | G06F 1/08 331/48 |
| 2013/0103969 A1* | 4/2013 | Wang | H03L 7/183 713/502 |
| 2017/0003708 A1* | 1/2017 | Migairou | H03L 7/085 |
| 2018/0307293 A1* | 10/2018 | Lambert | G06F 13/4265 |
| 2019/0013748 A1* | 1/2019 | Barrenscheen | H02P 6/15 |
| 2020/0119740 A1* | 4/2020 | Spirer | H03L 7/0991 |

* cited by examiner

SYSTEMS AND METHODS FOR CLOCK SYNCHRONIZATION IN TRANSMISSION OF AUDIO INFORMATION

CROSS-REFERENCE TO RELATED APPLICATIONS

This application claims the benefit of priority to Chinese Patent Application No. 2019000192221.6, filed on Mar. 14, 2019, which is incorporated herein by reference in its entirety.

BACKGROUND

Embodiments of the present disclosure relate to systems and methods for clock synchronization for transmission of audio information.

Loudspeakers, including headphones, have been widely used in daily life. Headphones are a pair of small loudspeaker drivers worn on or around the head over a user's ears, which convert an electrical signal to a corresponding sound.

Conventional Universal Serial Bus (USB) based headphones, especially the USB Type-C headphones, however, suffer from the over-size problem and the cost problem of the processing unit. The crystal oscillator used for clocking (e.g., create an electrical signal with a precise frequency) itself would take about 30% of the size of a printed circuit board (PCB) (i.e., the structure providing mechanical supports and electrical connections to the processing unit), and about 40% of the cost for manufacturing the processing unit.

SUMMARY

Embodiments of systems and methods for clock synchronization for transmission of audio information are disclosed herein.

In one example, a System on Chip (SoC) includes a Universal Serial Bus (USB) transceiver, an oscillator circuit free of a crystal, a frequency divider, and a clock synchronization calibrator. The USB transceiver is configured to extract a first synchronization clock associated with data received by the USB transceiver. The oscillator circuit free of a crystal is configured to generate an original clock. The frequency divider is configured to generate a second synchronization clock based on the original clock. The clock synchronization calibrator configured to generate a first set of frequency control data based on a frequency difference between the first synchronization clock and the second synchronization clock.

In another example, an SoC includes a Universal Serial Bus (USB) transceiver, a digital oscillator, a frequency divider, a clock synchronization calibrator, and a processor. The USB transceiver is configured to extract a first synchronization clock associated with data received by the USB transceiver. The digital oscillator is configured to generate an original clock. The frequency divider is configured to generate a second synchronization clock based on the original clock. The clock synchronization calibrator configured to calculate a frequency difference between the first synchronization clock and the second synchronization clock. The processor is configured to generate a first set of frequency synchronization data based on the frequency difference between the first synchronization clock and the second synchronization clock is greater than a first threshold.

In still another example, a method for clock synchronization in data transmission using a System on Chip (SoC) including a Universal Serial Bus (USB) transceiver, an oscillator circuit free of a crystal, a frequency divider and a clock synchronization calibrator. The method includes extracting, by the USB transceiver, a first synchronization clock associated with the data received by the USB transceiver and generating, by the oscillator circuit, an original clock. The method further includes generating, by the oscillator circuit, an original clock and generating, by the frequency divider, a second synchronization clock based on the original clock. The method also includes generating, by the clock synchronization calibrator, a first set of frequency control data based on a frequency difference between the first synchronization clock and the second synchronization clock.

In yet another example, a method for clock synchronization in data transmission using a System on Chip (SoC) including a Universal Serial Bus (USB) transceiver, an oscillator circuit free of a crystal, a frequency divider, a clock synchronization calibrator, and a processor. The method includes extracting, by the USB transceiver, a first synchronization clock associated with the transmitted data received by the USB transceiver and generating, by the digital oscillator, an original clock. The method further includes generating, by the frequency divider, a second synchronization clock based on the original clock and calculating, by the clock synchronization calibrator, a frequency difference between the first synchronization clock and the second synchronization clock. The method also includes generating, by the processor, a first set of frequency synchronization data based on the frequency difference between the first synchronization clock and the second synchronization clock.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
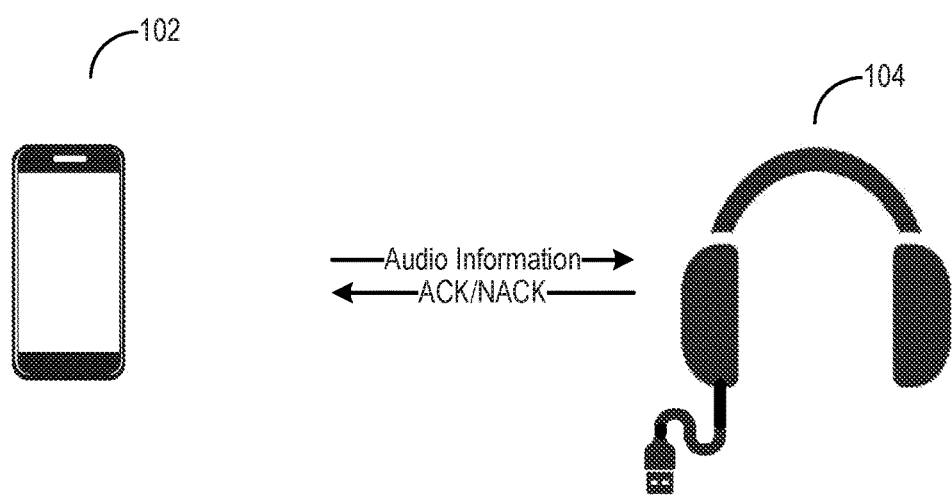
FIG. 1 is a block diagram illustrating an exemplary headphone system in accordance with various embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it is contemplated that such feature, structure, or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Universal Serial Bus (USB) based headphones (e.g., headphones based on USB Type-C connector system) is a type of wired headphones that receive data (e.g., audio information) from a USB host (e.g., a smart phone or a computer) through a physical bus (e.g., a USB cable that links the headphones with the USB host). The data can be transmitted based on a USB protocol (e.g., USB 1.0, USB 2.0, USB 3.0, etc.). For example, the host can transmit data (video, music, audio, or data packets) to the USB Type-C headphones using a USB cable. Comparing to traditional headphones (e.g., headphones using 3.5 mm connector for data transmission), the USB Type-C headphones can allow the data to stay in the digital domain for longer and thus can preserve the quality of the signal encoded better. However, as data transmits information as in packet form, a clock system within the headphones' processing unit to synchronizing the host's clock and the USB clock is important. Conventional headphones use crystal-based oscillators for clock synchronization, which makes the processing unit expensive and bulky.

As will be disclosed in detail below, among other novel features, the clock synchronization systems (e.g., a System on Chip (SoC)) including a digital oscillator (i.e., an oscillator free of a crystal) disclosed herein can achieve "clock synchronization" with lower cost and smaller in size. In some embodiments of the present disclosure, the USB transceiver of the headphones can receive data (e.g., data packets) from the host, and can extract both the clock information (e.g., a first synchronization clock based on identifying a Start of Frame (SOF) of the data packets) and the audio information (e.g., based on the payload of the data packets). The clock information is transmitted to a clock synchronization calibrator for synchronizing the host's clock and the USB clock (e.g., a second synchronization clock generated by a frequency divider, based on an original clock generated by the digital oscillator), and the audio information is transmitted to a processor for further processing.

In some embodiments, a digital oscillator free of a crystal generates an original clock, which is divided then divided into the USB clock (i.e., a second synchronization clock) for clock synchronization, a system clock for the processor to process and an audio clock for a decoder to decode the audio information. The clock synchronization calibrator can determine a difference between the clock information of the data (e.g., the first synchronization clock) and the USB clock (e.g., the second synchronization clock), and can synchronize the clock by generating a first set of frequency control data to calibrate the original clock generated by the digital oscillator.

In some embodiments, the clock synchronization calibrator can generate the first set of control data when a frequency difference (e.g., greater than zero) between the host's clock and the USB clock is detected. In some embodiments, the clock synchronization calibrator can generate the first set of control data when (i.e., on condition that) the processor determines that the frequency difference between the host's clock and the USB clock is greater than a first threshold. This can save the computing power and the overall power consumption of the SoC for clock synchronization.

Moreover, the clock synchronization systems can also have a temperature sensor for determining a functioning/current temperature of the SoC for compensating the effect on the digital oscillator's performance caused by the difference in working temperatures. For example, the temperature sensor can determine the functioning temperature for the SoC at the time point the headphone is being activated and can transmit the temperature data to the processor. The processor can determine if the functioning temperature of the SoC and a predetermined temperature (e.g., a benchmark temperature) is greater than a second threshold. The clock synchronization calibrator can calibrate the frequency of the clock generated by the digital oscillator based on generating a second set of frequency control data.

In some embodiments, the SoC can periodically synchronize the clock by determining the frequency difference between the host's clock (e.g., the first synchronization clock) and the USB clock (e.g., the second synchronization clock) in a predetermined interval. For example, the clock synchronization calibrator can determine the frequency difference between the host's clock and the USB clock for every 2 seconds, 5 seconds, 10 seconds, 20 seconds, etc. If the processor determines that the frequency difference is greater than the first threshold, the clock synchronization calibrator can initiate the clock synchronization process as disclosed above.

By synchronizing the clock, the SoC can minimize the risk of jitter (i.e., the timing error when reading the data) especially when the communication between the host and the headphone is at the speed of Full-Speed (e.g., 12 Mbit/s), Hight-Speed (480 Mbit/s) or higher. Performing clock synchronization can also improve the data read accuracy by reducing and/or avoiding the data misread caused by the timing error. This can thus improve the data transmission's quality and the stability of the headphone. Moreover, by using a digital oscillator free of a crystal instead of using a crystal-based oscillator for generating the USB clock, the overall size and the cost of the SoC can be significantly reduced.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 is a block diagram illustrating an exemplary USB based headphone system 100 in accordance with various embodiments. As illustrated in FIG. 1, USB based headphone system 100 (referred to as "headphone system 100" hereinafter) can include a host 102, a USB based headphone 104 (referred to as "headphone 104" hereinafter) and a physical bus such as a USB cable (not shown) that links host 102 and headphone 104. The data can be transmitted based on a USB protocol (e.g., USB 1.0, USB 2.0, USB 3.0, etc.).

Host 102 may be any suitable device that can provide data packets including video and/or audio information including, for example, video, music, or voice in the digital format. Host 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device.

Headphone 104 can include a pair of loudspeakers that can be worn on or around the head over a user's ears. Headphone 104 can also include any electroacoustic transducers that convert an electrical signal (e.g., representing the audio information provided by host 102) to a corresponding sound. In some embodiments, headphone 104 can include a pair of earbud (also known as earpiece) that can plug into the user's ear canal or a headset including headphone units that are physically held by a band over the head and/or electrically connected by a cord. In some embodiments, headphone 104 may further include a microphone to play the sound decoded from the audio information encoded in the data packets.

As shown in FIG. 1, bidirectional communications can be established between host 102 and headphone 104. Data packets can be transmitted from host 102 to headphone 104, and acknowledgment messages (e.g., acknowledgment messages (ACK) or negative acknowledgment (NACK)) can be transmitted back to host 102 from headphone 104. In some embodiments, a USB communication link can be established between host 102 and headphone 104 using the physical bus. Headphone 104 can receive audio information encoded in data packets in digital form.

In some embodiments, audio information may be a stream of audio information in the form of compressed or uncompressed samples for first and second audio channels, such as left-channel audio information and right-channel audio information or the like. The USB communication link can be bidirectional such that headphone 104 can transmit acknowledgment messages (ACK) back to host 102 in response to the reception of the audio information from host 102 or can transmit negative acknowledgment (NACK) messages to host 102 in response to not successfully receiving the audio information from host 102. In some embodiments, the USB communication between host 102 and headphone 104 can also be a unidirectional communication link in which headphone 104 receives the data packets from host 102, but does not transmit data (e.g., NACK messages) back to host 102.

In some embodiments, the data packets can be transmitted by host 102 according to the USB protocol at Low-speed rate (e.g., about 1.5 Mbit/s), Full-speed rate (e.g., about 12 Mbit/s), Hight-speed rate (e.g., about 480 Mbit/s) or higher speed rate (e.g., at Superspeed rate or Superspeed+rate). In some embodiments, the data packets include a synchronization sequence (i.e., Start of Frame (SOF)), such as an 8-bit synchronization sequence, a 32-bit synchronization sequence, etc. In some embodiments, for decoding the data packets received from host 102, headphone 104 can use a clock synchronization system (e.g., a System on Chip (SoC)) for synchronizing the host's clock and the USB clock. The synchronization sequence within the data packets can be used for clock synchronization (e.g., for determining a first synchronization clock representing the host clock) when decoding the data packets by a physical layer module of headphone 104.

Figure 2:
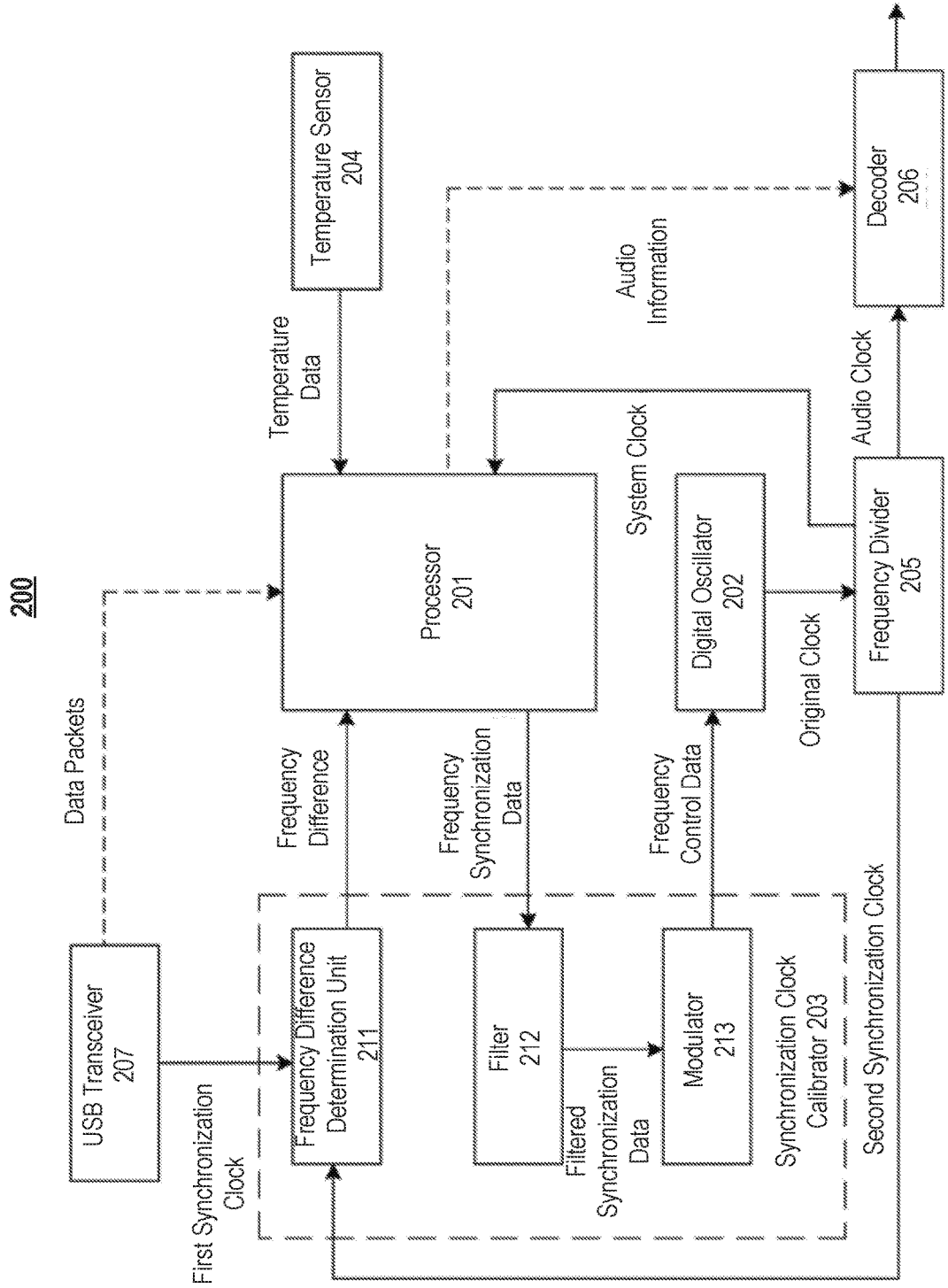
FIG. 2 is a detailed block diagram of the exemplary clock synchronization system in accordance with various embodiments.

FIG. 2 is a detailed block diagram of the exemplary SoC 200 in accordance with various embodiments. In the example illustrated in FIG. 2, SoC 200 in this example includes a processor 201, a digital oscillator 202, a clock synchronization calibrator 203, a frequency divider 205, a decoder 206, and a USB transceiver 207. It is understood that additional module(s) may be included in SoC 200, in the same integrated circuit (IC) chip in which processor 201, digital oscillator 202, clock synchronization calibrator 203, frequency divider 205, decoder 206 and USB transceiver 207 are formed. An SoC may combine the required electronic circuits of various computer components onto a single, integrated chip (IC). An SoC may be a complete electronic substrate system that may contain analog, digital, mixed-signal, or radio frequency functions.

USB transceiver 207 can be configured to receive data packets from a host (e.g., host 102 in FIG. 1) and transmit acknowledgment messages (e.g., ACK or NACK) to the host indicative of the successful reception of the audio information or not. USB transceiver 207 can implement a USB communication protocol, such as USB 1.0, USB 2.0, USB 3.0, or any of the variation of the standard USB communication protocols. USB transceiver 207 is configured to receive the data packets from the host and extract the clock information and the audio information from the data packets. In some embodiments, according to the standard USB protocol, the physical channel of the USB connection is divided into 8-bit bytes. For example, a data packet includes at least a SOF token (e.g., an incrementing frame number) for synchronization, and a payload for 0-1024 bytes, following a payload identifier.

In some embodiments, USB transceiver 207 is configured to extract a first synchronization clock representing the host clock and transmit the first synchronization clock to clock synchronization calibrator 203 for clock synchronization. The payload of the data packets can be transmitted to processor 201 for extracting the audio information.

In some embodiments, digital oscillator 202 includes an oscillator circuit free of a crystal, such as an inductor-capacitor oscillator circuit (LCOSC) or a ring oscillator circuit (ROSC) for generating an original clock (e.g., generating an output signal of a certain frequency). In some embodiments, the frequency of the original clock generated can be about 3 GHz (e.g., 2.7 GHz, 2.8 GHz, 2.9 GHz, 3 GHz, 3.1 GHz, etc.). The original clock can then be divided by a frequency divider 205 for generating a second synchronization clock for clock synchronization, a system clock for processor 201 to process the data packets, and an audio clock for decoder 206 to decode the audio information.

In some embodiments, digital oscillator 202 is designed such that the frequency of the original clock can be adjusted based on adjusting at least one component of digital oscillator 202. For example, the frequency of the original clock generated by digital oscillator 202 can be adjusted by adjusting the capacitance of a capacitor unit connected to the LCOSC. In some embodiments, the capacitor unit includes multiple capacitors connected in parallel. By controlling the connection of at least one branch of the multiple capacitors (e.g., the on/off of a digital logic control switch on that branch), the capacitance of the capacitor unit can be adjusted. It is appreciated that the method for adjusting the capacitance of the capacitor unit is not limited to the example disclosed herein. Other suitable adjustment methods can also be applied for adjusting the capacitance of the capacitor unit.

Because LCOSC has good phase noise characteristics and their ease of implementation (e.g., the circuit takes less space on a Printed Circuit Board (PCB) and cost less than a crystal based on oscillator circuit), by using digital oscillator 202 instead of a crystal-based oscillator, SoC 200 can be smaller in size and can be cheaper for cost comparing to conventional SoC for clock synchronization.

In some embodiments, frequency divider 205 can generate the second synchronization clock for clock synchronization, the system clock for processor 201 to process the data packets, and the audio clock for decoder 206 to decode the audio information by underclocking the original clock generated by digital oscillator 202. Frequency divider 205 can underclock the original clock by divide the original clock by different coefficients. For one specific example, the second synchronization can be about 120M Hz (e.g., the original clock divided by a coefficient of 25), the system clock can be about 24M Hz (e.g., the original clock divided by a coefficient of 125) and the audio clock can be about 24M Hz (e.g., the original clock divided by a coefficient of 125).

In some embodiments, clock synchronization calibrator 203 is configured to calibrate the frequency of the original clock by transmitting a first set of frequency control data to digital oscillator when a difference between the first synchronization clock and the second synchronization clock is greater than a first predetermined threshold. For example, clock synchronization calibrator 203 can receive both the first synchronization clock from USB transceiver 207 and the second synchronization clock from frequency divider 205 and generate a frequency control data on condition that the difference between the first synchronization clock and the second synchronization clock is greater than a first predetermined threshold.

In some embodiments, clock synchronization calibrator 203 can include a frequency difference determination unit 211, a filter 212, and a modulator 213. Frequency difference determination unit 211 is configured to determine a frequency difference between the first synchronization frequency and the second synchronization frequency. For example, frequency difference determination unit 211 can be a counter that counts the difference between the first synchronization frequency and the second synchronization frequency during a predetermined period of time. The difference in number can be used as the calculated frequency difference and can be transmitted to processor 201 to generate the frequency synchronization data.

Processor 201 can determine the difference between the first synchronization clock and the second synchronization clock is greater than a first predetermined threshold. If so, processor 201 can generate the frequency synchronization data and transmit the data to clock synchronization calibrator 203 accordingly. This could save the computing power and the overall power consumption of the SoC by making sure that the clock synchronization is performed only when the clock difference (e.g., the jitter) is greater than a certain extent. For example, processor 201 can generate the frequency synchronization data based on the frequency difference using suitable correlation fitting calculations and transmit the frequency synchronization data to filter 212 for filtering of clock synchronization calibrator 203. In some embodiments, processor 201 can include any appropriate type of general-purpose or special-purpose microprocessor, digital signal processor, or microcontroller.

In some embodiments, filter 212 can filter the frequency synchronization data by filtering out the high-frequency noise and interference. For example, filter 212 can be a low-pass filter that filters out signals higher than a predetermined frequency. The filtered frequency synchronization data is transmitted to modulator 213 to generate the frequency control data.

In some embodiments, modulator 213 can be a sigma-delta modulator that can modulate the filtered frequency synchronization data, such that a high-resolution digital signal (e.g., the filtered frequency synchronization data) can be converted into a low-resolution digital signal (e.g., the frequency control data) for calibrating the frequency of the original clock generated by digital oscillator 202. For example, modulate 213 can apply an oversampling modulation to the filtered frequency synchronization data and use an integrator to calculate a time integral of the filtered frequency synchronization data. By calculating the time integral of the filtered frequency synchronization data, the resolution of the signal can be significantly lowered.

In some embodiments, the frequency control data is transmitted to digital oscillator 202 for calibrating the frequency of the original clock generated by digital oscillator 202. For example, digital oscillator 202 can include instructions corresponding to an on/off of at least one component of digital oscillator 202. For example, the frequency control data includes instructions for controlling the connection of at least one branch of the multiple capacitors (e.g., on/off of a digital logic control switch on that branch) in an LCOSC, such that the capacitance of the capacitor unit can be adjusted as disclosed above. As the frequency of the original clock generated by digital oscillator 202 depends on the capacitance of the capacitor unit of the LCOSC (e.g., when the inductance of the inductor unit is fixed), the frequency of the original clock can be adjusted according to the frequency difference between the first synchronization clock and the second synchronization clock.

In some embodiments, decoder 206 can decode the audio information based on the audio clock generated based on the calibrated original clock. For example, decoder 206 can generate audio using an audio codec, based on the audio information. The audio can then be played by a speaker of the headphone.

In some embodiments, SoC can periodically perform the clock synchronization (e.g., determining the frequency difference between the first synchronization clock and the second synchronization clock, and calibrating the frequency of the original clock on condition that the frequency difference between the first synchronization clock and the second synchronization clock is greater than the predetermined threshold) after a predetermined interval. For example, processor 201 can include a timer, being set for sending a signal for initiating the clock synchronization for every X-second. X can be determined by the manufacturer or be manually set by a user of the headphone based on the user's preference. By periodically perform clock synchronization, the computing power and the overall power consumption of SoC 200 can be further saved.

In some embodiments, SoC can further include a temperature sensor 204 for compensating the frequency deviation of the frequency of the original clock, caused by the temperature difference. Temperature sensor 204 can be configured to obtain a functioning temperature of SoC 200 (e.g., the temperature of SoC 200 when USB based headphone 104 is activated), and can transmit the functioning temperature to processor 201 to generate a second set of control data on condition that a temperature difference between the functioning temperature and a benchmark temperature is greater than a predetermined threshold. For example, a benchmark performance of digital oscillator 202 can be obtained in a laboratory at the final test stage, under a benchmark temperature. When being activated, temperature sensor 204 can obtain the functioning temperature of SoC 200 (e.g., the current temperature of SoC 200 at the time point) and transmit the functioning temperature to processor 201. Processor 201 can determine the temperature difference between the functioning temperature and the benchmark temperature. If the temperature difference is greater than a predetermined threshold, processor 201 can generate a second set of frequency synchronization data and transmit the second set of frequency synchronization data to clock synchronization calibrator 203 for generating a second set of frequency control data. The frequency of the original clock generated by digital oscillator 202 can be calibrated based on the second set of control data to compensate for the frequency deviation caused by the temperature difference.

By compensating the frequency deviation caused by the temperature difference, SoC 200 can further increase the accuracy of the data communication between headphone 104 and host 102.

Figure 3:
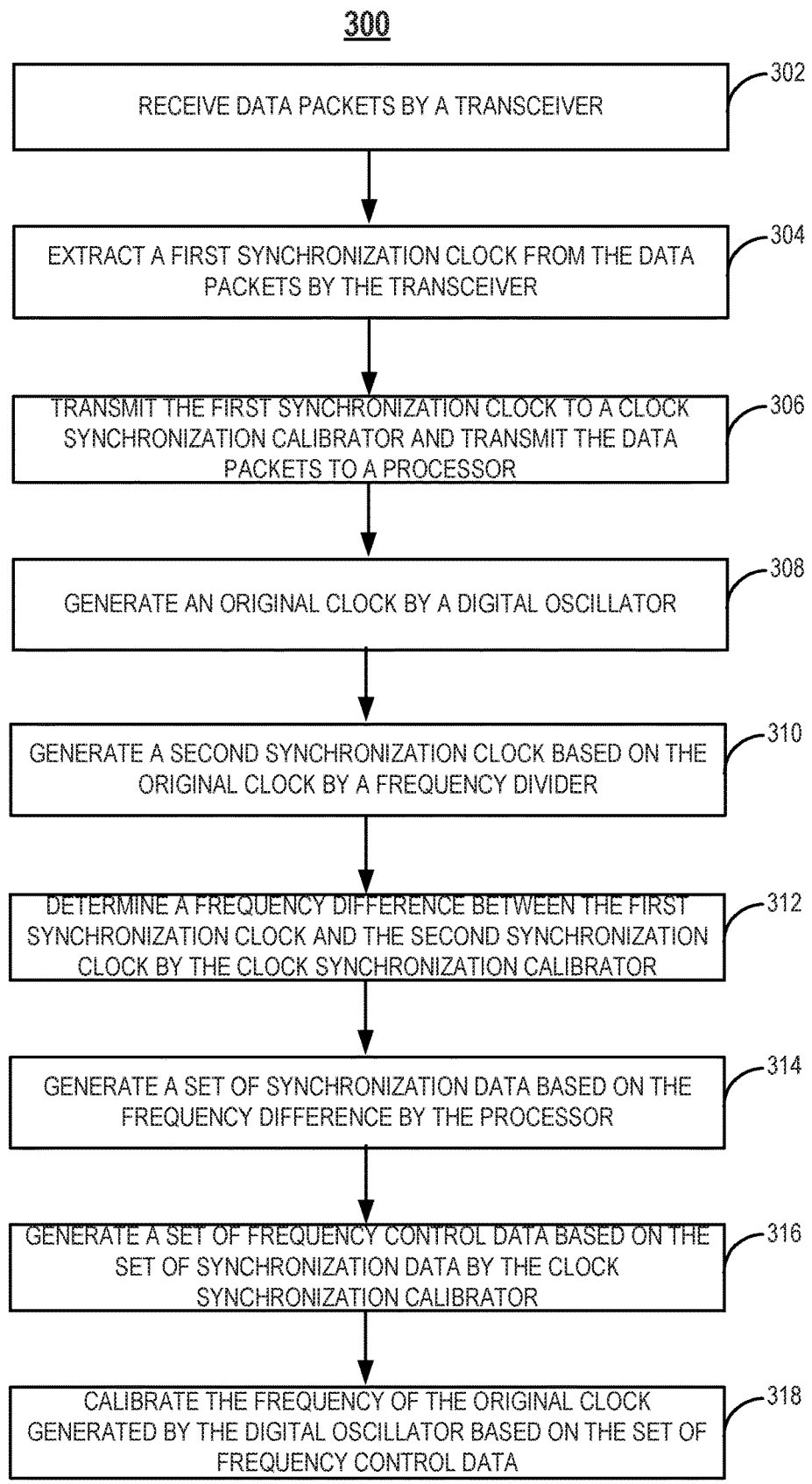
FIG. 3 is a flow chart illustrating an exemplary method for clock synchronization for transmission of audio information in accordance with an embodiment.

FIG. 3 is a flow chart illustrating an exemplary method 300 for clock synchronization in accordance with an embodiment. Method 300 can be performed by processing logic that can comprise hardware (e.g., circuitry, dedicated logic, programmable logic, microcode, etc.), software (e.g., instructions executed on a processing device), or a combination thereof. It is to be appreciated that not all operations may be needed to perform the disclosure provided herein. Further, some of the operations may be performed simultaneously, or in a different order than shown in FIG. 3, as will be understood by a person of ordinary skill in the art.

Method 300 shall be described with reference to FIGS. 1 and 2. However, method 300 is not limited to that exemplary embodiment. In method 300, a host clock (e.g., a first synchronization clock extract from data packets received by the SoC) and a USB clock (e.g., a second synchronization divided by a frequency divider based on the original clock generated by a digital oscillator) can be synchronized based on method 300 disclosed herein.

Starting at 302, data packets including audio information (e.g., encoded in the payload of the data packets) and clock information (e.g., determined based on a SOF of the data packets) are received by a transceiver. For example, the transceiver can include a physical layer module, configured to receive the data packets through a physical bus (e.g., a USB cable) based on a USB communication protocol.

At 304, a first synchronization clock representing the host clock is extracted by the transceiver from the data packets. For example, the first synchronization clock can be determined based on determining the location of the SOF of the data packets according to the USB protocol.

At 306, the first synchronization clock is transmitted to a clock synchronization calibrator, and the data packets are transmitted to a processor for pre-processing.

At 308, an original clock is generated by a digital oscillator. In some embodiments, the digital oscillator can include any kind of digital oscillator circuit suitable for generating the original. For example, the digital oscillator circuit can be a ring oscillator circuit or an inductor-capacitor oscillator circuit. The original clock can be generated based on an output of the oscillator circuits signal having a predetermined frequency.

At 310, a second synchronization clock can be generated by a frequency divider based on the original clock generated by the digital oscillator. For example, the frequency divider can underclock the original clock by dividing the frequency of the original clock by a predetermined coefficient. In one specific example, the original clock can be about 3 GHz, and the predetermined coefficient can be about 25.

At 312, a frequency difference between the first synchronization clock and the second synchronization clock can be determined by the clock synchronization calibrator. For example, the clock synchronization calibrator can include a counter configured to count the frequency difference between the first synchronization clock and the second synchronization clock during a predetermined period of time, and the calculated frequency difference can be used to represent the frequency difference between the first synchronization clock and the second synchronization clock.

At 314, a set of frequency synchronization data can be generated by the processor based on the calculated frequency difference. For example, the processor can generate the frequency synchronization data by applying a correlation fitting calculation to the calculated frequency difference.

At 316, a set of frequency control data can be generated by the clock synchronization calibrator based on the frequency synchronization data. For example, the clock synchronization calibrator can include a filter for filtering the high-frequency noise and interference out from the frequency synchronization data and a modulator (e.g., a sigma-delta modulator) for reducing the resolution of the filtered frequency synchronization data to generate the set of frequency control data.

At 318, the frequency of the original clock generated by the digital oscillator can be calibrated based on the set of frequency control data. For example, the set of frequency control data can control the capacitance of a capacitor unit connected to the oscillator circuit (e.g., the set of frequency control data includes instructions corresponding to controlling an on/off of a digital logic switch in the capacitor unit).

In some embodiments, the clock synchronization can be conducted periodically after a certain time interval. This can save the computing power and the overall power consumption of the SoC when performing clock synchronization.

Figure 4:
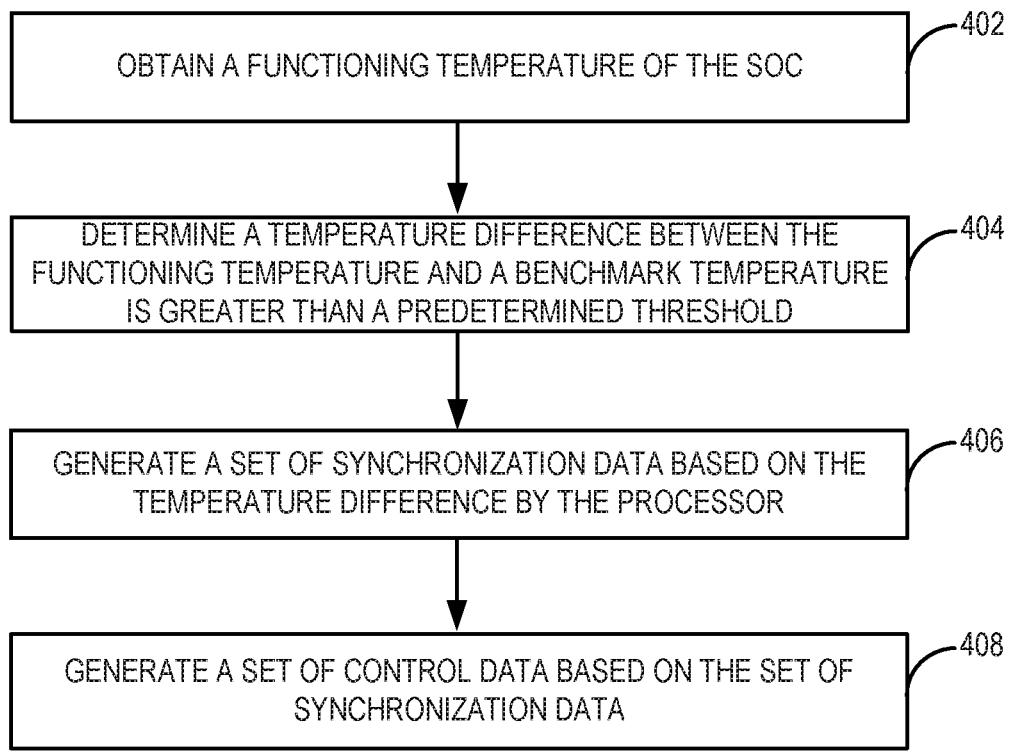
FIG. 4 is a flow chart illustrating an exemplary method for temperature compensation in clock synchronization in accordance with an embodiment.

FIG. 4 is a flow chart illustrating an exemplary method 400 for temperature compensation in clock synchronization in accordance with an embodiment. Method 400 can be performed by processing logic that can comprise hardware (e.g., circuitry, dedicated logic, programmable logic, microcode, etc.), software (e.g., instructions executed on a processing device), or a combination thereof. It is to be appreciated that not all operations may be needed to perform the disclosure provided herein. Further, some of the operations may be performed simultaneously, or in a different order than shown in FIG. 4, as will be understood by a person of ordinary skill in the art.

Method 400 shall be described with reference to FIGS. 1-3. However, method 400 is not limited to that exemplary embodiment. In method 400, the frequency of the USB clock (e.g., the second synchronization clock) is compensated for the effect caused by temperature differences.

Starting at 402, a functioning temperature is obtained by a temperature sensor. In some embodiments, the function temperature can be obtained at the time point the headphone is being activated.

At 404, a temperature difference between the functioning temperature and a benchmark temperature is determined. For example, the benchmark temperature can be the temperature under which the final test for the headphone was conducted.

At 406, if the temperature difference is greater than a predetermined threshold, the processor can generate the frequency synchronization data based on the temperature difference. For example, the frequency synchronization data can be generated by the processor by applying a correlation fitting calculation to calibrate the digital oscillator's performance affected by the temperature difference.

At 408, a set of frequency control data can be generated by the clock synchronization calibrator based on the frequency synchronization data, similar to 316 of method 300.

Using a digital oscillator free of a crystal for clock synchronization can improve the data read accuracy by reducing and/or avoiding the data misread caused by the timing error. This can thus improve the data transmission's quality and the stability of the headphone. Moreover, by avoiding a crystal-based oscillator for generating the USB clock, the overall size, and the cost of the SoC can be significantly reduced.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should 1 be understood that the present disclosure is not limited thereto. Other embodiments and modifications thereto are possible and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A System on Chip (SoC), comprising:
a Universal Serial Bus (USB) transceiver configured to extract a first synchronization clock associated with data received by the USB transceiver;
a digital controlled LC-oscillator circuit free of a crystal, configured to generate an original clock, the digital controlled LC-oscillator circuit comprising:
 a plurality of capacitors connected in parallel; and
 a digital logic control switch configured to control a connection of at least one of the plurality of capacitors;
a frequency divider configured to generate a second synchronization clock based on the original clock; and
a clock synchronization calibrator configured to generate a first set of frequency control data based on a frequency difference between the first synchronization clock and the second synchronization clock.

2. The SoC of claim 1, further comprising:
a processor configured to generate a first set of frequency synchronization data on the condition that the frequency difference between the first synchronization clock and the second synchronization clock is greater than a first threshold,
wherein the clock synchronization calibrator is further configured to generate the first set of frequency control data by modulating the first set of frequency synchronization data.

3. The SoC of claim 2, wherein the digital controlled LC-oscillator circuit further comprises at least one of a ring oscillator circuit or an inductor-capacitor oscillator circuit; and
wherein the digital controlled LC-oscillator circuit is further configured to adjust a frequency of the original clock based on the first set of frequency control data.

4. The SoC of claim 3, wherein the first set of frequency control data comprises instruction corresponding to an on/off of at least one component of the digital controlled LC-oscillator circuit.

5. The SoC of claim 2, wherein the processor is further configured to periodically determine the frequency difference between the first synchronization clock and the second synchronization clock in a predetermined time interval.

6. The SoC of claim 1, wherein the frequency divider is further configured to generate an audio clock based on the original clock; and
wherein the SoC further comprises an audio decoder configured to decode the data received by the transceiver based on the audio clock.

7. The SoC of claim 6, wherein the frequency divider is further configured to generate the second synchronization clock and the audio clock by dividing the original clock by a first predetermined coefficient and a second predetermined coefficient, respectively.

8. The SoC of claim 1, further comprising a temperature sensor configured to obtain a functioning temperature of the SoC.

9. The SoC of claim 8, wherein the clock synchronization calibrator is further configured to generate a second set of frequency control data on a condition that a difference between the functioning temperature and a predetermined temperature is greater than a second threshold.

10. A System on Chip (SoC), comprising:
a Universal Serial Bus (USB) transceiver configured to extract a first synchronization clock associated with data received by the USB transceiver;

a digital oscillator comprising:
  a plurality of capacitors connected in parallel; and
  a digital logic control switch configured to control a connection of at least one of the plurality of capacitors, wherein the digital oscillator is configured to generate an original clock;
a frequency divider configured to generate a second synchronization clock based on the original clock;
a clock synchronization calibrator configured to calculate a frequency difference between the first synchronization clock and the second synchronization clock; and
a processor configured to generate a first set of frequency synchronization data based on the frequency difference between the first synchronization clock and the second synchronization clock.

11. The SoC of claim 10, wherein the clock synchronization calibrator comprises:
  a filter configured to:
    receive the first set of frequency synchronization data from the processor; and
    generate a filtered frequency synchronization data by filtering the first set of frequency synchronization data; and
  a modulator configured to generate a first set of frequency control data by modulating the filtered frequency synchronization data.

12. The SoC of claim 11, wherein the digital oscillator comprises at least one of a ring oscillator circuit or an inductor-capacitor oscillator circuit; and
  wherein the digital oscillator is further configured to adjust a frequency of the original clock based on the first set of frequency control data.

13. The SoC of claim 12, wherein the first set of frequency control data comprises instruction corresponding to an on/off of at least one component of the digital oscillator.

14. The SoC of claim 10, wherein the frequency divider is further configured to generate an audio clock based on the original clock; and
  wherein the SoC further comprises an audio decoder configured to decode the data received by the transceiver based on the audio clock.

15. The SoC of claim 14, wherein the frequency divider is configured to generate the second synchronization clock and the audio clock by dividing the original clock by a first predetermined coefficient and a second predetermined coefficient, respectively.

16. The SoC of claim 10, further comprising a temperature sensor configured to obtain a functioning temperature of the SoC.

17. The SoC of claim 16, wherein the processor is further configured to generate a second set of frequency synchronization data on a condition that a difference between the functioning temperature and a predetermined temperature is greater than a predetermined threshold.

18. The SoC of claim 10, wherein the processor is further configured to periodically determine the frequency difference between the first synchronization clock and the second synchronization clock in a predetermined time interval.

19. A method for clock synchronization in data transmission using a System on Chip (SoC) comprising a Universal Serial Bus (USB) transceiver, a digital controlled LC-oscillator circuit free of a crystal, a frequency divider and a clock synchronization calibrator, comprises:
  extracting, by the USB transceiver, a first synchronization clock associated with the data received by the USB transceiver;
  generating, by the digital controlled LC-oscillator circuit, an original clock, wherein the digital controlled LC-oscillator comprises a plurality of capacitors connected in parallel and a digital logic control switch configured to control a connection of at least one of the plurality of capacitors;
  generating, by the frequency divider, a second synchronization clock based on the original clock; and
  generating, by the clock synchronization calibrator, a first set of frequency control data based on a frequency difference between the first synchronization clock and the second synchronization clock.

20. A method for clock synchronization in data transmission using a System on Chip (SoC), comprising a Universal Serial Bus (USB) transceiver, a digital oscillator, a frequency divider, a clock synchronization calibrator, and a processor, comprises:
  extracting, by the USB transceiver, a first synchronization clock associated with the transmitted data received by the USB transceiver;
  generating, by the digital oscillator comprising a plurality of capacitors, an original clock, by controlling a connection of at least one of the plurality of capacitors;
  generating, by the frequency divider, a second synchronization clock based on the original clock;
  calculating, by the clock synchronization calibrator, a frequency difference between the first synchronization clock and the second synchronization clock; and
  generating, by the processor, a first set of frequency synchronization data based on the frequency difference between the first synchronization clock and the second synchronization clock.

* * * * *